Dec. 25, 1951  J. ALGER  2,579,533
DEVICE FOR RELEASING STUCK ROCK DRILL STEELS
Filed June 13, 1949  2 SHEETS—SHEET 1
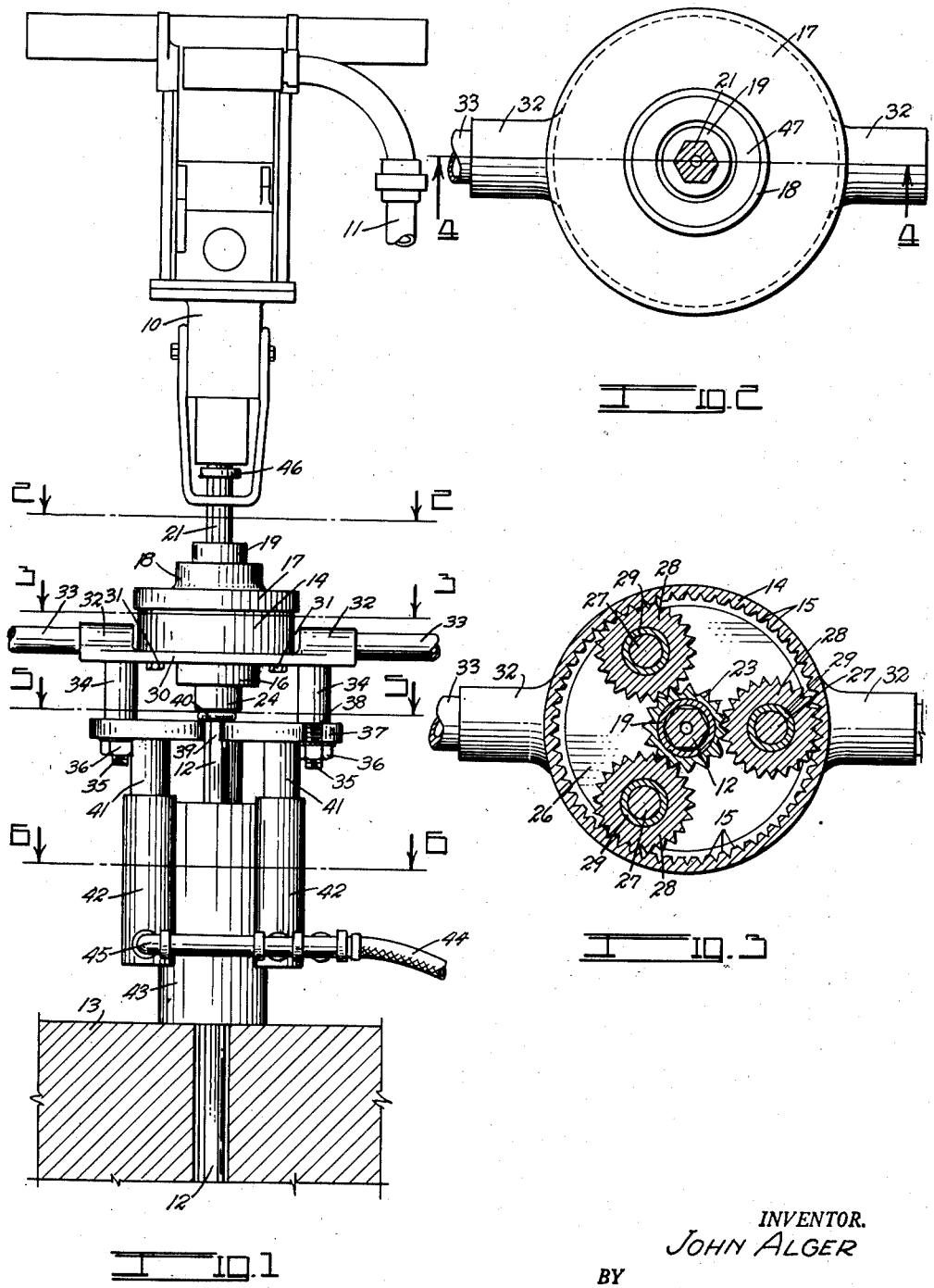
INVENTOR.
JOHN ALGER
BY
ATTORNEY

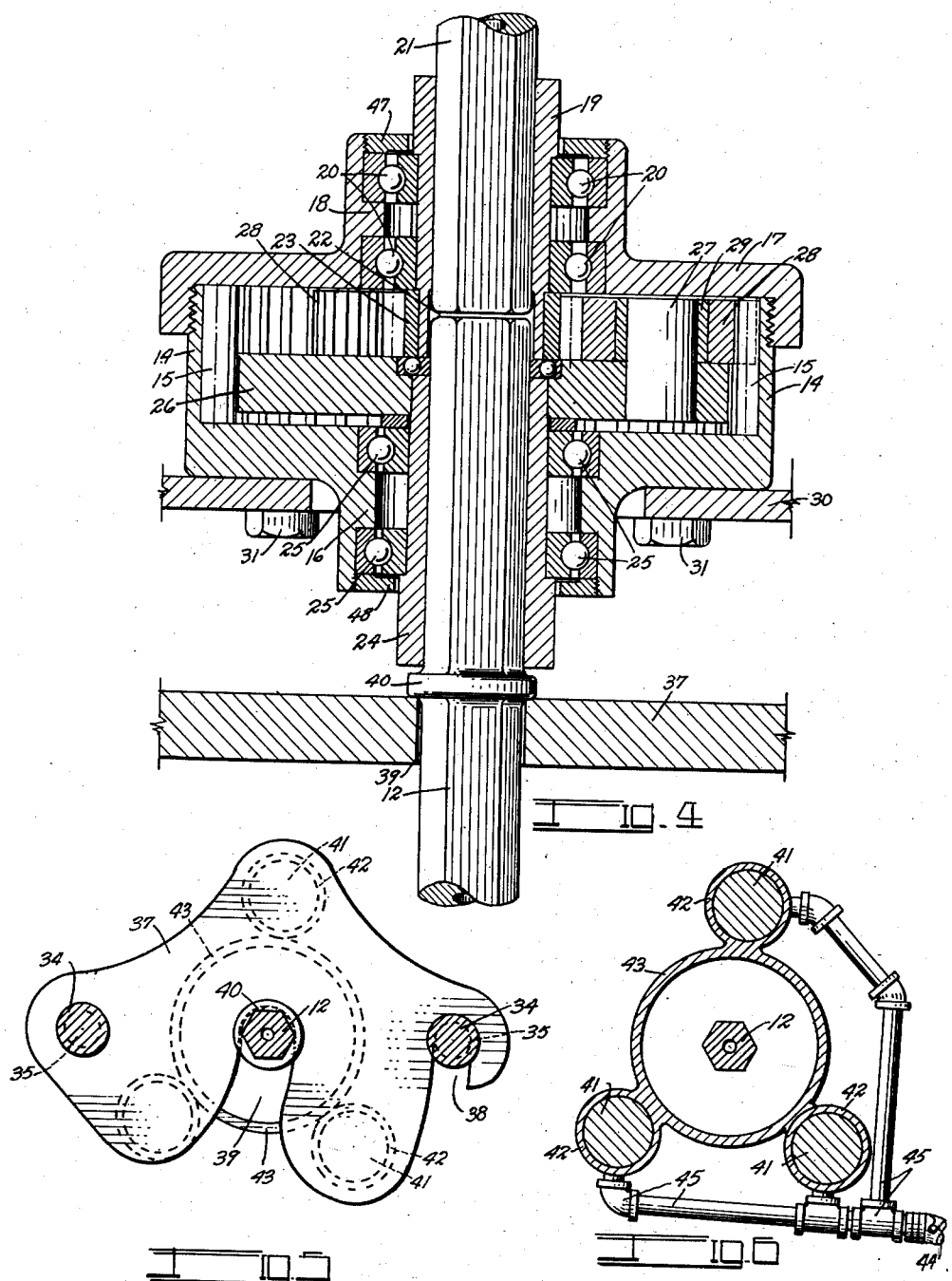

Patented Dec. 25, 1951

2,579,533

UNITED STATES PATENT OFFICE 2,579,533

DEVICE FOR RELEASING STUCK ROCK DRILL STEELS

John Alger, Lakewood, Colo.

Application June 13, 1949, Serial No. 98,776

6 Claims. (Cl. 255—36)

This invention relates to a device for releasing stuck rock drill steels. When drilling relatively deep rock drill holes downwardly, it is impossible for the air discharge from a pneumatic drill to remove the rock dust from the holes. This rock dust packs above the drill bit and makes it impossible at times to withdraw the drill steel. This difficulty occasions not only the loss of drill steels in deep drilling jobs, but requires the drilling of additional, unnecessary drill holes. Hydraulic jacks and other devices have been devised for use in attempting to withdraw the stuck drill steels. These are occasionally successful, but in many cases it is impossible to save the steel even with the most powerful of hydraulic jacks. Rock drills are arranged to rotate the drill while impacting the latter for both drilling and withdrawing purposes, but often when it is attempted to withdraw the drill from a deep drill hole, it will become so wedged in the accumulated rock dust that the rotating mechanism cannot function.

The principal object of this invention is to provide a simple, portable drill steel attachment which can be placed upon the protruding shank of a stuck drill steel, and which will act to multiply the rotative power of the rock drill so as to exert a relatively great turning torque on the drill while subjecting it to a simultaneous withdrawing and vibrating action so as to cause the drill to break down and bore through the dust ring formed in the drill hole.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates the improved device for releasing stuck rock drill steels applied to such a steel, with a conventional drill in place thereon;

Figs. 2 and 3 are enlarged cross-sections, taken on the lines 2—2 and 3—3, respectively, Fig. 4;

Fig. 4 is a still further enlarged, vertical section, taken on the line 4—4, Fig. 2; and Figs. 5 and 6 are cross-sections, taken on the lines 5—5 and 6—6, respectively, Fig. 1.

In the drawing, a conventional pneumatic rock drill of the type designed to deliver impact blows to drill steel is diagrammed at 10, with its feeder air hose at 11. A stuck drill steel is shown at 12, with its withdrawing flange at 40, and the rock being drilled is indicated at 13.

The improved drill-releasing device employs a cylindrical ring gear housing 14 having internal ring gear teeth 15. A tubular bearing enclosure 16 projects downwardly and concentrically from the bottom of the housing 14. A removable cap 17 is threaded on and closes the top of the housing 14. The cap is also provided with a tubular bearing enclosure 18 which projects upwardly and concentrically from the cap 17.

A hollow stub sleeve 19 is mounted in suitable anti-friction bearings 20 in the enclosure 18. The sleeve 19 has a hexagonal bore in its upper portion to receive a hexagonal drill stub 21. The hexagonal bore terminates before the bottom of the sleeve 19 is reached, leaving an enlarged, cylindrical concavity 22 therein. A sun gear 23 is keyed or otherwise fixedly mounted on the lower extremity of the stub sleeve 19 about the concavity 22.

A drill steel sleeve 24 is mounted in the bearing enclosure 16 upon suitable anti-friction bearings 25. The drill steel sleeve 24 also has a hexagonal bore for receiving the hexagonal upper extremity of the stuck drill steel 12. A circular planet disc 26 is keyed or otherwise fixedly mounted on the upper extremity of the steel sleeve 24 within the housing 14.

The planet disc 26 carries a plurality of planet gear shafts 27 fixed therein and protruding upwardly therefrom. In the embodiment illustrated, there are three of the shafts 27, each rotatably supporting a planet gear 28, there being a suitable bronze bearing bushing 29 interposed between each gear 28 and its shaft 27. The planet gears 28 are constantly in mesh with both the ring gear teeth 15 and the teeth of the sun gear 23.

It can be readily seen that if the housing be held and the hexagonal drill stub 21 be rotated, the drill steel 12 will be rotated in the same direction at one-half the speed of the stub 21 and with increased torque, due to the planet gear set embodied in the housing 14.

The housing 14 is mounted on a supporting plate 30 by means of suitable cap screws 31. The supporting plate 30 is provided with suitable cap screws 31. The supporting plate 30 is provided with suitable handle sockets 32 designed to receive carrying handles 33 of any desired length.

A pair of oppositely positioned supporting posts 34 extend downwardly from the plate 30 at opposite sides of the bearing enclosure 16. These posts terminate at their bottoms in threaded studs 35 of smaller diameter than the posts and designed to receive clamping nuts 36.

One of the studs 35 serves as a pivot stud for a swinging steel-engaging plate 37, which is shown more in detail in Fig. 5. The plate 37 is provided with an arcuate engaging notch 38 for engaging the opposite stud 35, and with an arcuate steel-engaging notch 39 which, when the plate is swung into position on both posts 34, will snugly engage the drill steel 12 below the withdrawing collar 40 thereon.

The entire mechanism thus far described is supported on, and urged upwardly by, a plurality of pneumatic pistons 41 protruding upwardly from pneumatic (or hydraulic) jack cylinders 42. The jack cylinders 42 are welded or otherwise mounted on a tubular support 43 which rests upon the surface of the rock 13. Air is simultaneously supplied to all of the cylinders 42 through the medium of a suitable air hose 44 and pipe 45.

The drill stub 21 is relatively short and is provided with a withdrawing flange 46 similar to the flange 40. The stub 21 extends into the drill 10, similarly to the usual drill steel. The bearing enclosures 16 and 18 are closed by annular bearing retaining rings 48 and 47, respectively.

Let us assume that a stuck drill steel is encountered, such as indicated by the steel 12. The drill 10 is removed from the steel and the support 43 is placed thereabout. The collar 24 is slipped onto the upper extremity of the steel supported by the flange 40. The plate 37 is swung into position below the flange 40 and the nuts 36 are partially tightened. The stub 21 is inserted in the stub collar 19 and the drill 10 is then applied to the upper extremity of the stub 21, as shown in Fig. 1. Air is now applied to both the drill and the jack cylinders 42. The housing 14 is prevented from rotating by means of the handles 33.

This subjects the drill 12 to a combined twisting action through the multiplying torque of the planet gear set in the housing 14 and to vibration caused by the lower extremity of the stub 21 impacting the upper extremity of the steel 12 within the cavity 22. It also subjects the drill to a withdrawing action through the upward pressure of the pistons 41 against the plate 37. The simultaneous combination of all these actions has been successful in withdrawing stuck drill steels in excess of twenty feet in length, which could not be moved by the most powerful hydraulic jacks.

It will be noted that as the steel loosens, it will be lifted and the looseness followed up by the continuous elevating action of the pistons 41.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A device for transmitting torque and impact to a stuck rock drill steel of the type having a withdrawing flange adjacent its upper extremity, comprising: a ring gear housing; a tubular steel-receiving sleeve projecting downwardly from said housing and non-rotatably receiving the upper extremity of the drill steel; a tubular drill stub sleeve extending upwardly from said housing; a drill stub non-rotatably mounted in and projecting upwardly from said drill stub sleeve, said drill stub being in alignment with and impacting against the drill steel in the first sleeve; a sun gear affixed on said drill stub sleeve within said housing; a planet gear disc fixed on said steel-receiving sleeve within said housing; planet gears carried by said planet gear disc in mesh with said sun gear and said ring gear housing so as to impart rotation from said stub sleeve to said drill-receiving sleeve at reduced speed; means for preventing rotation of said housing; and a rock drilling device mounted on said drill stub for impacting and rotating the latter.

2. A device for removing a stuck rock drill steel of the type having a withdrawing flange adjacent its upper extremity, comprising: a ring gear housing; a tubular steel-receiving sleeve projecting downwardly from said housing and non-rotatably receiving the upper extremity of the drill steel; a tubular drill stub sleeve extending upwardly from said housing; a drill stub non-rotatably mounted in and projecting upwardly from said drill stub sleeve, said drill stub being in alignment with and impacting against the drill steel in the first sleeve; a sun gear affixed on said drill stub sleeve within said housing; a planet gear disc fixed on said steel-receiving sleeve within said housing; planet gears carried by said planet gear disc in mesh with said sun gear and said ring gear housing so as to impart rotation from said stub sleeve to said drill-receiving sleeve at reduced speed; a rock drilling device mounted on said drill stub for impacting and rotating the latter; and means carried by said housing and engaging the drill steel below the withdrawing flange thereon so that when said housing is urged upwardly, said drill steel will also be urged upwardly.

3. A device for removing a stuck rock drill steel of the type having a withdrawing flange adjacent its upper extremity, comprising: a ring gear housing; a tubular steel-receiving sleeve projecting downwardly from said housing and non-rotatably receiving the upper extremity of the drill steel; a tubular drill stub sleeve extending upwardly from said housing; a drill stub non-rotatably mounted in and projecting upwardly from said drill stub sleeve, said drill stub being in alignment with and impacting against the drill steel in the first sleeve; a sun gear affixed on said drill stub sleeve within said housing; a planet gear disc fixed on said steel-receiving sleeve within said housing; planet gears carried by said planet gear disc in mesh with said sun gear and said ring gear housing so as to impart rotation from said stub sleeve to said drill-receiving sleeve at reduced speed; a rock drilling device mounted on said drill stub for impacting and rotating the latter; a pair of oppositely positioned posts extending downwardly from said housing; and a notched plate pivoted on one of said posts and engaging the other of said posts, the notch in said plate being positioned to engage said drill steel below the withdrawing flange thereof so that when said housing is urged upwardly, said drill steel will be urged outwardly.

4. A device for removing a stuck rock drill steel of the type having a withdrawing flange adjacent its upper extremity, comprising: a ring gear housing; a tubular steel-receiving sleeve projecting downwardly from said housing and non-rotatably receiving the upper extremity of the drill steel; a tubular drill stub sleeve extending upwardly from said housing; a drill stub non-rotatably mounted in and projecting upwardly from said drill stub sleeve, said drill stub being in alignment with and impacting against the drill steel in the first sleeve; a sun gear affixed on said drill stub sleeve within said housing; a planet gear disc fixed on said steel-receiving sleeve within said housing; planet gears carried by said planet gear disc in constant mesh with both said sun gear and said ring gear housing so as to impart rotation from said stub sleeve to said drill-receiving sleeve at reduced speed; a rock drilling device mounted on said drill stub for impacting and rotating the latter; a supporting plate attached to and supporting said housing; and handle means carried by and projecting outwardly from said supporting plate to prevent rotation of the latter.

5. Means for transmitting torque and impact from a pneumatic rock drill of the type arranged to simultaneously impact and rotate a hexagonal drill steel, comprising: a first rotary sleeve having a hexagonal axial bore extending therethrough in which said drill steel is positioned; a second rotary sleeve in axial alignment with and at one end of said first sleeve; a hexagonal drill stub positioned in a hexagonal axial bore extending through said second sleeve, said drill stub contacting said drill steel at one extremity and projecting from said second sleeve at the other extremity, said latter extremity being received in said rock drill so as to be impacted and rotated thereby; and reduction gears transmitting torque from said second sleeve to said first sleeve.

6. Means for transmitting torque and impact from a pneumatic rock drill of the type arranged to simultaneously impact and rotate a hexagonal drill steel as recited in claim 5 in which the reduction gears comprise: a sun gear fixedly mounted on said second sleeve adjacent said first sleeve; a planet disc fixedly mounted on said first sleeve adjacent said sun gear; planet gears rotatably mounted eccentrically on said disc in constant mesh with said sun gear; a housing surrounding said gears; an internal ring gear fixed in said housing in constant mesh with said planet gears; and means for resisting rotation of said housing.

JOHN ALGER.

REFERENCES CITED

The following references are of record in the file of this patent:

UNITED STATES PATENTS

| Number | Name | Date |
|---|---|---|
| 1,087,089 | Trotter | Feb. 10, 1914 |
| 1,654,011 | Osanni | Dec. 27, 1927 |
| 1,855,116 | Prajer | Apr. 19, 1932 |
| 1,895,132 | Minor | Jan. 24, 1933 |

FOREIGN PATENTS

| Number | Country | Date |
|---|---|---|
| 419,187 | Germany | Sept. 21, 1925 |